April 27, 1937.  J. R. SALZMAN ET AL  2,078,544
AIRPLANE
Filed May 15, 1935    4 Sheets-Sheet 1
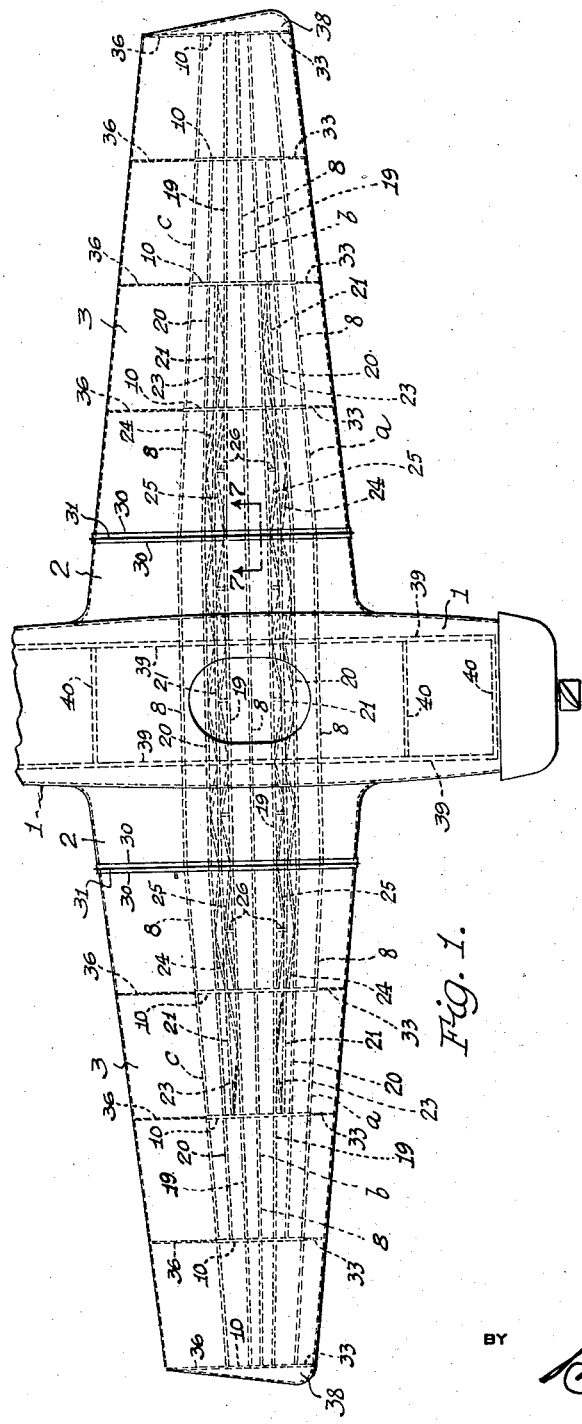
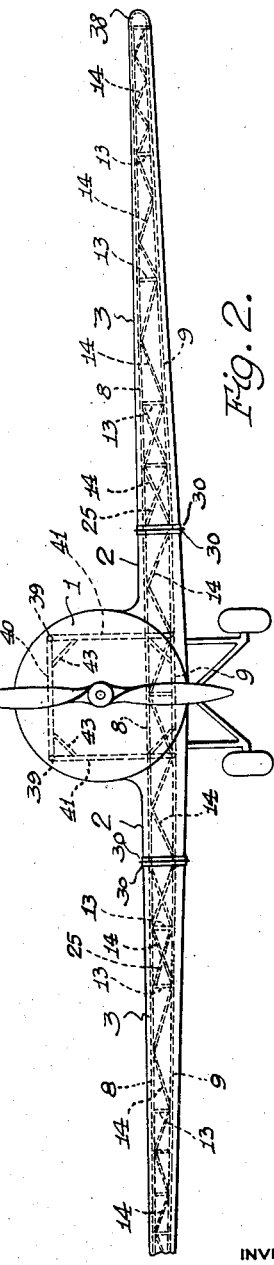
INVENTOR
Joseph R. Salzman,
Carl J. Snyder,
BY
ATTORNEYS

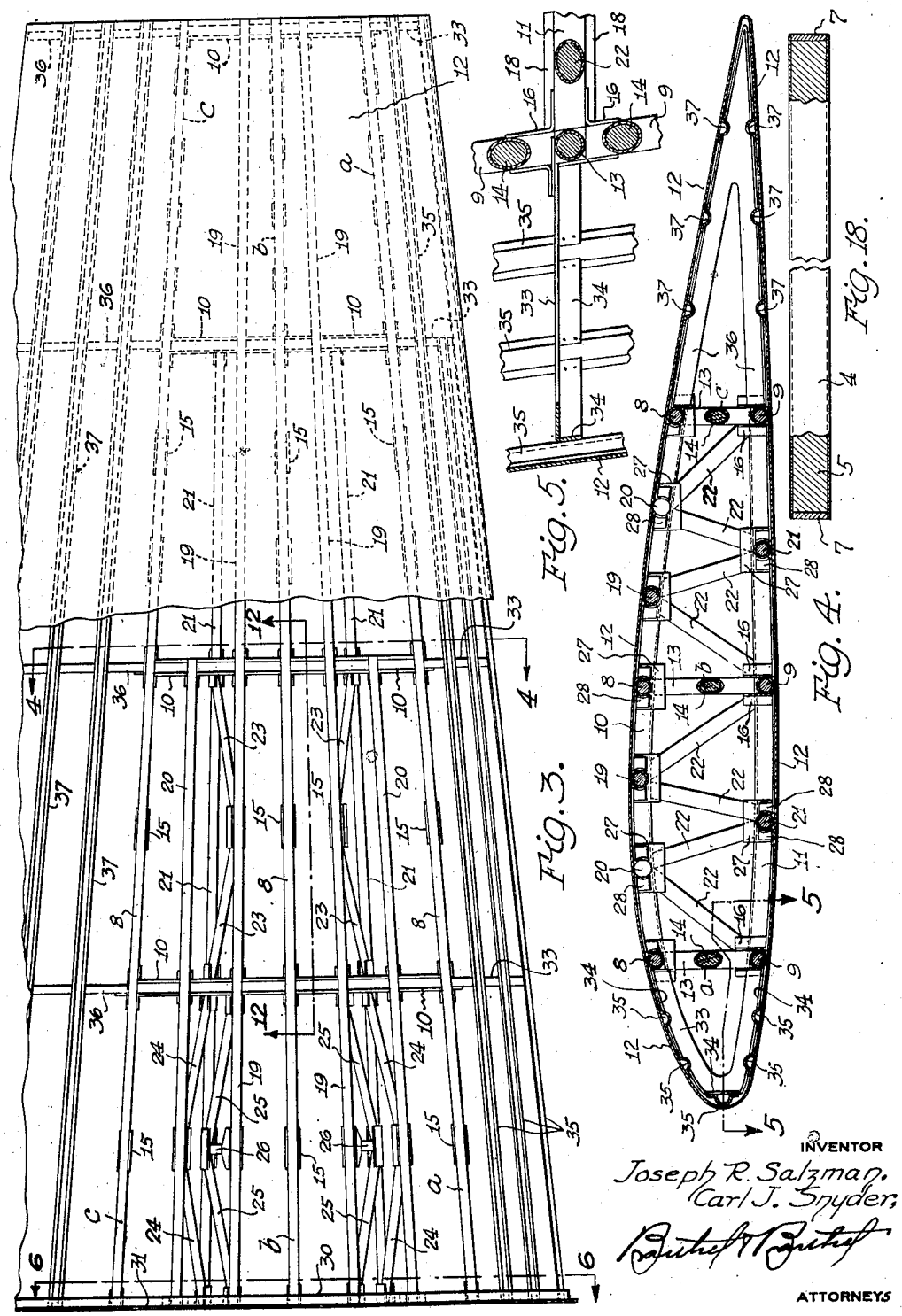

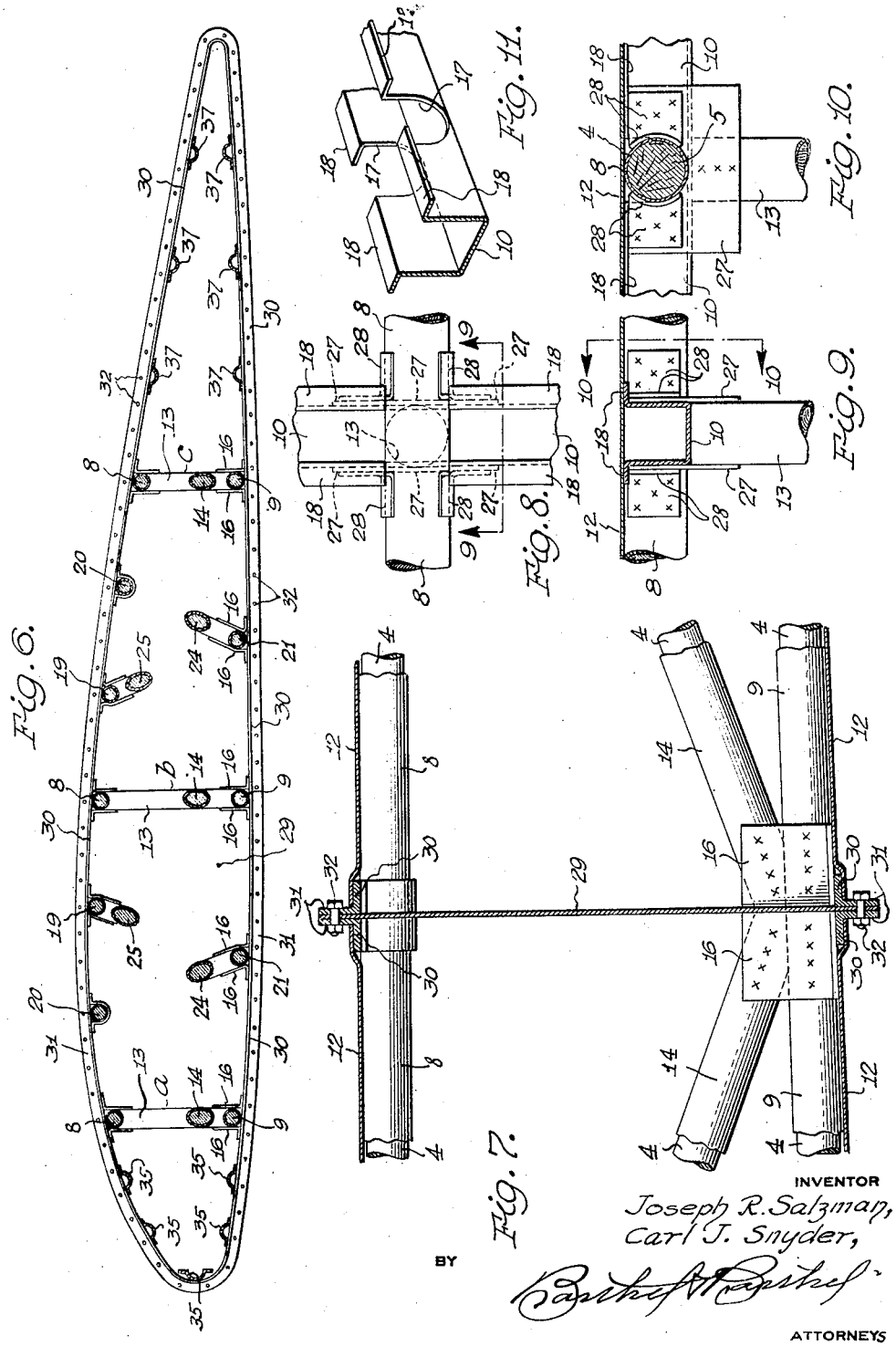

April 27, 1937. J. R. SALZMAN ET AL 2,078,544
AIRPLANE
Filed May 15, 1935 4 Sheets-Sheet 4
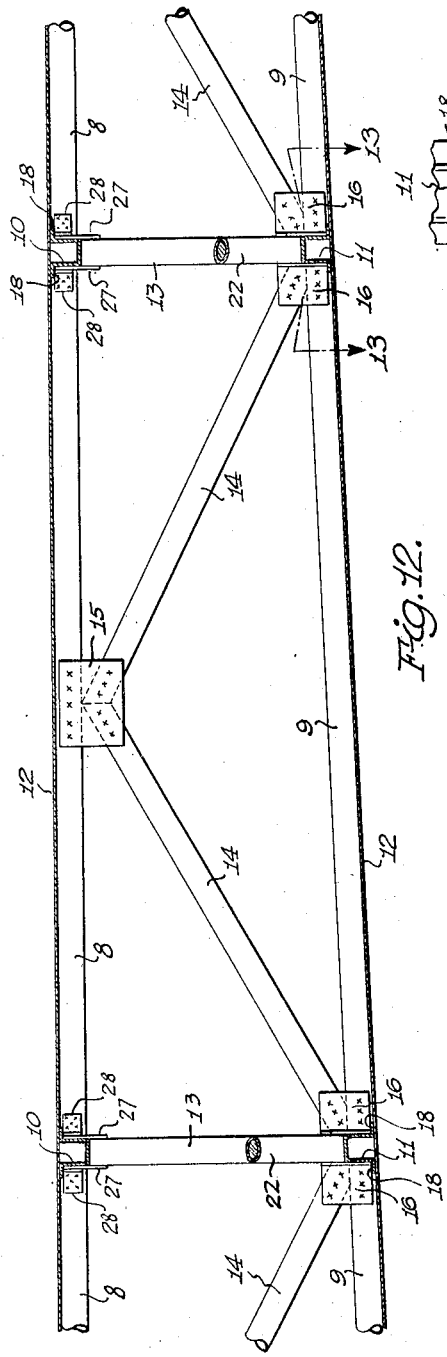
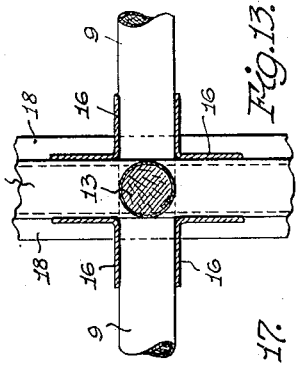
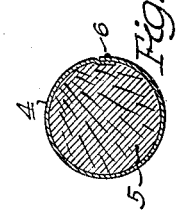
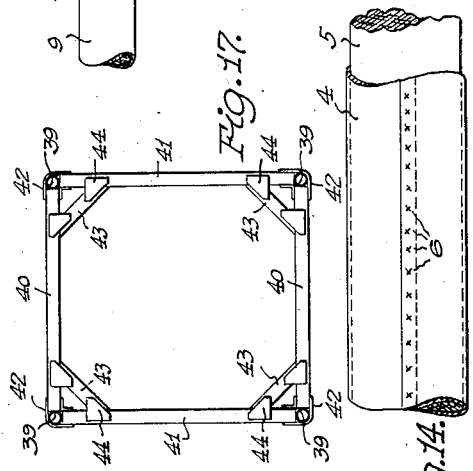
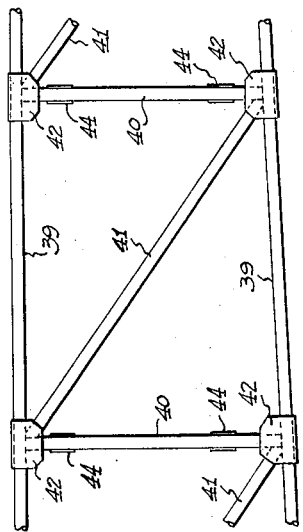
INVENTOR
Joseph R. Salzman,
Carl J. Snyder,
BY
ATTORNEYS Patented Apr. 27, 1937

2,078,544

UNITED STATES PATENT OFFICE 2,078,544

AIRPLANE

Joseph R. Salzman and Carl J. Snyder, Detroit, Mich.; said Salzman assignor to J. Hugo Smith, Detroit, Mich.

Application May 15, 1935, Serial No. 21,606

20 Claims. (Cl. 244—123)

This invention relates to airplane construction, and more particularly to composite members and the manner in which such members are joined to form an airplane framing comprising fabricated spars, compression, drag and anti-drag members, trussing and bracing; the main object of the present invention being to provide an airplane construction of minimum weight and maximum strength.

A further object is to provide a framing formed principally of members, each comprising a wood core and a sheath of thin sheet metal, these members being of minimum cross-sectional area to reduce weight and of high resistance to bending and fracture, to give great strength, a maximum of strength in proportion to weight being secured through the employment in the construction of each member, of a very thin, light sheet metal sheath which is stiffened and prevented from buckling or collapsing, by being completely filled throughout its length by a wood core which also adds its strength thereto in the most effective manner by being placed therein under endwise compression with the arrangement such as to further compress the wood by load application to the member, such sheath holding the wood core against splitting or other disintegration.

It is also an object to facilitate assembly and add strength and rigidity to the several junctures by spot welding metal gusset members to the end portions of the meeting ends of the several metal sheaths of the several members and to thin sheet metal channel rib members of box-like cross sectional construction, the weight of the structure being thus further reduced by the form of such ribs, and also by eliminating the necessity for bolts or similar heavy fastening means, while retaining strength and rigidity of connections.

It is also an object to provide strength and rigidity without added weight, by providing fittings formed of sheet metal which fittings form seats for adjacent members and are formed with flanges for spot welding to such members, and to provide sheet metal nose and trailing edge formers formed with seats for sheet metal channel stringers provided with flanges for spot welding to an outer non-stressed sheet metal skin, thus further minimizing weight and simplifying construction and assembly.

A further object is to so fabricate a wing structure as to provide for the strong, rigid detachable attachment of the main portion of each wing to the body thereof or to the fuselage by securing the spar or main longérons of one part in firm end abutting relation to those of the other part, and to provide for ready disassembly for shipment or repair, the construction, arrangement and combination of parts also including certain other new and useful features, all as hereinafter set forth, reference being had to the accompanying drawings, wherein Figure 1 is a plan view of an airplane illustrative of an embodiment of the present invention;

Fig. 2 is a front end elevation of the same;

Fig. 3 is a partial plan view of the main portion of one wing with a portion of the skin thereof broken away to disclose the internal construction or framing;

Fig. 4 is a transverse section through a wing, substantially upon the line 4—4 of Fig. 3;

Fig. 5 is a sectional detail upon the line 5—5 of Fig. 4;

Fig. 6 is a transverse section through a wing, substantially upon the line 6—6 of Fig. 3;

Fig. 7 is an enlarged sectional detail substantially upon the line 7—7 of Fig. 1;

Fig. 8 is a detail plan view of a joint at the crossing of a channel rib and longéron or spar member;

Fig. 9 is a section substantially upon the line 9—9 of Fig. 8;

Fig. 10 is a section substantially upon the line 10—10 of Fig. 9;

Fig. 11 is a perspective detail of a portion of a channel rib formed with a crossing seat for a longéron or spar member;

Fig. 12 is an enlarged section substantially upon the line 12—12 of Fig. 3;

Fig. 13 is a sectional detail substantially upon the line 13—13 of Fig. 12;

Fig. 14 is an enlarged detail showing the construction of the framing and longitudinal spar members;

Fig. 15 is an end view of Fig. 14;

Fig. 16 is a detail showing a portion of the fuselage framing in side elevation;

Fig. 17 is an end view of Fig. 16; and

Fig. 18 is a detail of the members forming the longérons, spar and other frame members, in section at their ends to show the construction thereof.

As shown in Figs. 1 and 2, 1 indicates the fuselage, as a whole, of the airplane shown, 2 indicates stub or base portions of the wings, which portions are formed as an integral part of the fuselage and extend laterally therefrom in opposite directions, the main portion 3 of each wing being detachably attached to its base portion, forming a continuation thereof and being tapered in both width and thickness to continue the general tapering formation of each stub which is integral with said fuselage adjacent its forward end with the lower side of each stub extending substantially in the horizontal plane of the lower side of said fuselage. Each of these elements includes an internal supporting and strengthening framework, each frame being constructed principally of members of a construction and formation designed to give great strength in proportion to weight, and each comprises, as shown in detail in Figs. 14, 15 and 18, a sheath 4 of thin sheet metal and a core 5 preferably formed of wood and of a size and cross-sectional shape to fit closely within and completely fill said sheath.

Each sheath of these frame members as shown, is formed by bending a sheet metal strip into the desired tubular form with overlapping longitudinal edges, and then uniting these overlapped edges by resistance spot welding as at 6. The core, after being formed to the proper size and cross-sectional shape, is then inserted endwise into this tubular sheath completely filling the same and extending substantially throughout its length, or where the member is of cylindrical form as shown, which is the preferable form, the metal strip may be wrapped tightly around the formed core by a rolling, drawing or other process with its longitudinal edge portions overlapped, and then, while the metal is so held, spot welding these overlapped portions together. Or where the sheath is formed up prior to the insertion of the core, this sheath may be in the form of a tube having a continuous wall, or a wall formed by butt welding the edges of a sheet metal strip together.

Framing members may thus be provided having great strength in proportion to weight, the thin sheet metal sheath giving strength and bending resistance and the continuous wood core lending its strength thereto and at the same time filling the tubular sheath to prevent its collapse, said sheath in turn resisting the breaking, splitting or cracking of the wood and protecting it against disintegration due to exposure to the elements, to dampness, etc. Such core may be further strengthened by forcing metal disks or plugs 7 into the ends of the sheath after the insertion of the core and against the ends thereof, as shown in Fig. 18, and spot welding these plugs in place to completely close the end of the sheath and hold the wood core therein under endwise compression so that any tendency toward deflection of the member under load will tend to further compress the wood core and thus increase the stiffness and strength of the member. Framing members, such as longérons, trusses, braces and members of extended lengths, such as spar members, are thus provided, which are very light in weight and of small cross-sectional area, providing, when assembled in the manner hereinafter described, a framing of maximum strength and minimum weight, and the members of which are particularly adapted to be spot welded into a frame structure, due to such metal sheath, thus further reducing the weight of the structure without sacrificing strength.

Obviously members of the described construction may be assembled in various ways within the wing and/or fuselage framing of an airplane but to secure the most efficient structures, having in mind the maximum of strength and rigidity in proportion to weight and ease and facility of assembly, a particular construction and arrangement of wing structure is shown in detail in Figs. 3 to 13 inclusive of the accompanying drawings.

Referring particularly to the main portion 3 of each wing, the framing of each of these wing portions comprises three spars, separately indicated as a whole, by the letters $a$, $b$ and $c$ to distinguish them from their parts, which spars extend the full length of the wing section and each comprise an upper member 8 of the composite type described, formed with a wood core and metal sheath, and a lower member 9 of the same construction, said members extending longitudinally of the wing in outwardly convergent relation with upper ribs 10 and lower ribs 11 are made of a plurality of short sections of box-like formation and of comparatively large cross sectional area and extending at intervals transversely of these spars to tie said spars together and support the wing skin 12 in proper wing configuration and unstressed. The upper and lower longérons 8 and 9 of each spar are connected where the ribs 10 and 11 cross them, by vertical posts or composite struts 13, and to take compression and load strains on each spar, composite brace members 14 extend longitudinally of each spar between said struts, these braces being secured at one end to the lower longéron 9 within the meeting angles of struts and longéron and at their opposite ends to the upper longéron 8 intermediate adjacent posts with the ends of these diagonal braces in abutting relation and secured together and to the longéron by side plates 14 placed against opposite sides of said longéron and brace and spot welded to the sheath of each to transmit upward thrust of the load on the wing to the upper longérons of the spars in the direction of said longérons to place the wood cores thereof under further endwise compression, through the plugs 7. The struts 13, braces 14 and longéron 9 where they meet the ends of the rib sections 11 at the crossing of ribs and longéron, are all firmly secured together by corner gusset plates 16 spot welded to the several members, the ribs, which are all of sheet metal channel construction, having the side walls cut away or notched at 17 where each longéron crosses the same, to form seats for said longérons which thus seat upon the bottom wall of each channel at such crossing point. The channel members forming each of the ribs 10 and 11, have the outer edges of the side walls of the channel turned outwardly, forming flanges 18 so that the wing skin 12 may be spot welded to these flanges throughout the length of each rib, and as the skin rests upon the longérons due to the notching of the ribs where they cross the same, the skin may also be spot welded to said longérons throughout the length thereof.

To aid the spars $a$, $b$, $c$ in supporting the skin at the upper side of the wing and in taking the load stresses, two supplemental longérons 19 are extended the full length of the wing section, one at each side of the central spar $b$ and spaced therefrom, and extending parallel with and midway between these members 19 and the spars $a$ and $c$ are other supplemental longérons 20 which extend only to the mid rib of the wing. Located at the lower side of the wing and midway between the longérons 9 of the outer spars $a$ and $c$ and the lower longéron of the central spar $b$ are longérons 21 and drag and anti-drag brace members 22 extend diagonally between the several members 9 and the several upper longérons 19 and 20 directly between the rib members 10 and 11 of each rib structure to together form the primary drag and anti-drag trussing of the wing. To form supplemental drag, anti-drag and also compression and load trussing, pairs of diagonal truss members 23 are provided between adjacent ribs midway of the length of the wing section with the lower ends of the members of each pair secured to the longérons 21 at the place of attachment of the brace members 22 thereto, and at their upper ends, these truss members of each pair are abutted and secured to the longérons 19 intermediate the adjacent ribs. The pair of these members 23 located forwardly of the central spar b or toward the nose of the wing and extending longitudinally of the wing, brace the wing against drag thereon and also take compression and load and the pair at the rear side of said spar, in a like manner, takes anti-drag, load and compression. Between the rib at the base end of the wing section and the next rib, are located other similar pairs 24 of drag and anti-drag brace members, these members of each pair being secured at their abutting ends to the longérons 20, and at their opposite or lower ends to the longérons 21. Pairs of braces 25 similar to the brace members 24 are provided except that they are reversed, are secured at their abutting ends to the lower longérons 21 and at their upper ends to the longérons 19 and are further strengthened in their effective compression and load carrying power, by the provision of a strut 26 (see Fig. 3) between said longérons 21 and 19 at the meeting angle of the members of each pair.

Where the several longérons cross the several channel ribs, as shown in detail in Figs. 8, 9, 10 and 13, very strong, rigid connections of minimum weight are provided by spot welding sheet metal plates 27 to the outer surfaces of the side walls of said channels and also to the sides of the struts 13 and braces 22, and to further strengthen the connections and secure said longérons seated in their seats 17 in said channel ribs, corner gussets 28 are spot welded with one wing of each secured to one of said plates and the other wing curved to fit a side of the longéron and spot welded thereto. A very strong fitting or joint is thus provided which is of minimum weight.

The stub or base portions 2 of the airplane wings are provided with an internal framing which extends transversely through the lower part of the fuselage adjacent its nose or forward end, and this framing comprises spars forming a continuation of the wing spars and also comprises trussing, drag and anti-drag members, the same as the main wing portions, which main wing portions are made separable from their stub portions for convenience in shipping or repair, by providing a bulkhead plate 29 shown in detail in Figs. 6 and 7 and having a marginal outline to conform to the cross sectional shape of the wing at the end of each wing stub, each of these bulkheads being rigidly attached to the framing of each stub and forming a rigid place of attachment for the abutting end of each detachable wing end portion 3 with the longérons of said portions aligned and in end opposed relation to the ends of like members of the continuation of the spars within the lower part of the fuselage 1 and stubs 2.

Each of these bulkhead plates 29 projects along its entire margin, a short distance beyond the wing skin, and angle bars 30 are bent to conform to the external shape of the wing at the end of each stub, and these angle bars are each secured, one to the end of the stub and the other to the abutting end of the wing section, by spot welding the inner flange of each angle bar between the wing skin 12 and framing members and to each with the outstanding flanges of these bars abutting opposite sides of the margin of the bulkhead plate, said margin and flanges thus together forming a very strong, rigid outstanding rib 31 provided with a series of openings for bolts 32 for securing these angle bars together and thus detachably securing the main wing portions 3 to the stub portions 2.

The nose portion of each wing is formed by nose forming frame members 33, each forming a continuation of each pair of channel rib members 10 and 11, and each bent to substantially the desired configuration of the nose and provided with a lateral flange 34 at its outer edge to which the skin 12 is spot welded, these members being each also formed with a series of seats for a series of nose forming stringers 35 extending longitudinally of the wing across the formers 33, and each stringer formed of thin sheet metal of channel form to give stiffness and each formed with outer lateral flanges to which the skin is spot welded, thus providing a strong, rigid nose portion of the desired sectional contour and which is light in weight.

The trailing edge of each wing is formed in a similar manner by edge formers or trailing edge frame members 36 secured at their forward ends to the spar c in line with each pair of channel ribs 10, 11. Channel stringers 37 similar to the stringers 35 are secured to the formers 36 and the skin 12 is spot welded to these formers and stringers. The free end of each wing is closed by an end portion 38 shown in Fig. 1, by forming the skin thereover to the desired form and contour and welding these formed ends of the skin to the body thereof and to the internal framing in any suitable manner.

The fuselage framing is somewhat similar in construction to that of the wings, it being made up principally of composite members formed with a wood core and a thin sheet metal sheath, the same as the principal members of the wing framing, the fuselage framing comprising a substantially rectangular frame as shown in Figs. 16 and 17 made up of four longérons 39 spaced apart by struts 40 with bracing members 41 extending longitudinally of the fuselage and diagonally from the upper end of one strut to the lower end of an adjacent strut, each seating at its ends within the meeting angles of struts and longérons and all firmly secured together at these meeting points by angle plates 42 spot welded to the outer sides of longérons, struts and bracing members. These angle connections between struts and longéons, are further braced by brace members 43 extending across the several corner angles and secured at their ends by side plates 44 spot welded thereto and to the sides of the angularly extending struts.

A practically all metal construction is thus provided having maximum strength to a minimum of weight due to the fact that the main members are formed with a wood core to reduce weight and with a metal sheath to give strength and to permit the uniting of the parts by welding, thus making it possible to employ sheet metal connections instead of heavy cast fittings. The present construction further lends itself particularly to the providing of a detachable wing and to facility and cheapness of fabrication.

What we claim is:—

1. A framing member including a metal sheath and a core of fibrous material substantially filling said sheath, and means secured to said sheath for applying endwise compressive force to said core under flexing strains on said member.

2. A framing member adapted to be subjected to load and bending strains, said member comprising a sheath of thin metal, and a continuous core substantially filling said sheath and under compression longitudinally of said sheath, and means secured to said sheath for holding said core compressed and for applying further endwise compressive force to said core upon flexing of said member.

3. A framing member of extended length and limited cross sectional area comprising a tube of thin sheet metal, a wood core filling said tube and under endwise compression therein, and a member secured within an end of said tube in contact with said core to hold said core under endwise compression.

4. A framing member comprising a strength imparting and protecting sheath of thin material having closed ends, a wood core filling said sheath and extending substantially the full length thereof and under endwise compression between said closed ends.

5. A framing including a longéron comprising a tube of thin metal having closed ends, and a member in said tube abutting said closed ends and in endwise compression therebetween.

6. A framing member including a wood core and a metal sheath with said core confined therein against longitudinal movement and put under endwise compression by bending moment applied to said member.

7. A member of extended length formed of wood and of limited cross sectional area, a sheath of thin metal extending throughout the length thereof and enclosing the same, and metal closures for the ends of said sheath secured thereto in firm contact with the ends of said wood member.

8. A framing including a plurality of framing members, each member comprising a wood core and a thin metal sheath, said sheaths engaging the ends of said cores to brace said cores longitudinally upon lateral deflection of said members, and means for uniting said members within said framing, said means including metal members welded to said sheaths of adjacent framing members.

9. A framing including longérons and bracing members, said longérons and members each comprising a wood core enclosed in a metal sheath with said sheaths engaging the ends of said cores to apply endwise compression to said cores under bending moment of said sheaths of said longérons, and means for securing said bracing members together and to said longérons at their ends and in angular relation to said longérons, said means including members formed of sheet metal and welded to said sheaths of said longérons and end portions of said sheaths of said bracing members at the several points of juncture of said members with said longérons.

10. An airplane wing structure including a framing comprising a plurality of longérons each including a thin metal sheath and a core under endwise compression therein, said structure including rib members of box-like cross section extending transversely of said longérons and formed with seats therefor, and bracing between said rib members.

11. An airplane wing structure including a framing comprising a plurality of spars each comprising spaced apart upper and lower longérons each having a core under endwise compression and a thin sheath to hold said core under compression and intermediate struts and diagonal bracing members between said longérons, and a plurality of structures including rib members extending transversely of and formed with seats for said spars and rigidly secured thereto.

12. A structure including a plurality of spaced apart spars, a plurality of spaced apart structures extending transversely of said spars and including upper and lower rib members of thin metal and rectangular channel form in cross section, forming members each forming a continuation of said rib members of each of said structures, and a plurality of sheet metal channel stringers extending transversely of said nose forming members and secured thereto exteriorly thereof.

13. A structure as characterized in claim 12 and including trailing edge forming members each forming a continuation of one of said structures and the rib members thereof, and a plurality of sheet metal channel stringers extending transversely of and secured to said trailing edge forming members.

14. An airplane including stub wing-portions, main wing portions each including a metal sheath and a wood core therein under endwise compression, spars in said portions including upper and lower longérons, bulkheads interposed between the ends of said stub and main portions, and means for detachably securing said main to said stub portions with said bulkheads interposed therebetween, and with the ends of said longérons of said spars in said main and stub portions in end abutting relation to said bulkheads and in aligned and opposed relation at opposite sides thereof.

15. An airplane including stub wing-portions having internal framing including longérons and outstanding flanges at their ends, main wing portions having spars including longérons each comprising a wood core and a thin metal sheath with said core confined therein under endwise compression, said wing portions also having outstanding flanges to oppose said flanges on said stub portions, bulkhead plates with their margins interposed between said flanges on said stub portions and said flanges on said main portions, and means for detachably securing said opposed flanges together with said plate margins therebetween and with the longérons of said framing and spars in end abutting relation to said plates and in longitudinal alinement.

16. A structure comprising a framing including a plurality of composite longérons each having a wood core and a metal sheath extending throughout its length with said core under endwise compression, said longérons being arranged along the upper and lower sides of the structure, diagonal bracing members between said longérons, and plugs secured in the ends of said sheaths in contact with the ends of said cores to hold the same under endwise compression and to further compress the same upon lateral deflection of said framing under load.

17. A framing including a plurality of longérons arranged in spaced relation along the upper and lower sides of the structure, each longéron comprising a metal sheath and a wood core placed and confined therein under endwise compression, structures spaced apart and extending transversely of said longérons and each structure including upper and lower channel rib members formed of sheet metal and of rectangular cross section and with seats for said longérons, and a sheet metal skin secured to said channel rib members and longérons.

18. An airplane wing framing including a plurality of spaced spars each comprising a pair of longérons each formed of a tube and a wood core completely confined therein under endwise compression and arranged, one adjacent the upper side of the wing and the other adjacent the lower side, each spar also including struts and compression and load bracing members extending between and connected at their ends to said longérons, intermediate longérons between adjacent spars also each formed of a tube and a wood core confined therein, bracing members connected to said intermediate longérons and to said longérons of said spars, a plurality of spaced apart drag and anti-drag structures extending transversely of all of said spars and each comprising an upper and a lower rib member each formed with seats for said longérons and drag and anti-drag bracing secured at their ends to said rib members and with said longérons of said spars extending transversely of and secured within said seats on said rib members, nose forming members each forming a continuation of said rib members of each drag and anti-drag structure, a plurality of sheet metal stringers of channel form extending transversely of and secured to said nose formers, a plurality of trailing edge formers each forming a continuation of said rib members of each drag and anti-drag structure, and a plurality of sheet metal stringers of channel form extending transversely of said trailing edge formers and secured thereto.

19. An airplane wing framing as characterized in claim 18 and wherein said rib members and nose and trailing edge formers are flanged to provide for the spot welding of a sheet metal wing skin thereto and are also formed with seats for said longérons and said stringers.

20. An airplane comprising a fuselage, stub wing portions extending laterally therefrom, main wing portions for attachment to said stubs and including wing framing comprising spars each including composite longérons each formed with a wood core and a metal sheath and with closed ends to confine said core under endwise compression each spar including composite bracing members each having a wood core and a metal sheath, intermediate composite longérons each having a wood core and a metal sheath having closed ends to confine said core under endwise compression, drag and anti-drag formations and each including upper and lower sheet metal channel rib members of rectangular form in cross section and drag and anti-drag bracing connecting said rib members, nose and trailing edge formers, stringers extending transversely of and secured to said formers, members formed of sheet metal and welded to said longérons and bracing members at their places of meeting to unite the same, and a skin of sheet metal spot welded to said longérons, rib members, and stringers.

JOSEPH R. SALZMAN.
CARL J. SNYDER.